United States Patent
Nodera et al.

(10) Patent No.: US 6,576,706 B1
(45) Date of Patent: Jun. 10, 2003

(54) FLAME-RETARDANT POLYCARBONATE RESIN COMPOSITION AND FORMED ARTICLE

(75) Inventors: Akio Nodera, Ichihara (JP); Masahiro Kitayama, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/744,248

(22) PCT Filed: Dec. 15, 1999

(86) PCT No.: PCT/JP99/07027

§ 371 (c)(1),
(2), (4) Date: Jan. 30, 2001

(87) PCT Pub. No.: WO00/39217

PCT Pub. Date: Jul. 6, 2000

(30) Foreign Application Priority Data

Dec. 25, 1998 (JP) ............................................. 10-368391
Dec. 25, 1998 (JP) ............................................. 10-368392
Aug. 18, 1999 (JP) ............................................. 11-231118

(51) Int. Cl.[7] ...................... C08L 69/00; C08L 83/10; C08L 83/04
(52) U.S. Cl. .................. 525/67; 525/101; 525/92 A; 525/464; 524/264; 524/265; 524/451
(58) Field of Search ........................ 525/67, 101, 464, 525/92 A; 524/264, 265, 451

(56) References Cited

U.S. PATENT DOCUMENTS

| | | | |
|---|---|---|---|
| 4,393,161 A | * | 7/1983 | Van Abeelen |
| 5,380,795 A | * | 1/1995 | Gosens |
| 5,621,029 A | | 4/1997 | Eckel et al. |
| 5,723,526 A | * | 3/1998 | Nagasawa |
| 6,174,944 B1 | | 1/2001 | Chiba et al. |
| 6,184,312 B1 | * | 2/2001 | Yamamoto |
| 6,355,767 B1 | * | 3/2002 | Takagi |

FOREIGN PATENT DOCUMENTS

| | | | |
|---|---|---|---|
| EP | 692522 | * | 1/1996 |
| EP | 829 521 | | 3/1998 |
| JP | 06-287430 | | 10/1994 |
| JP | 08-081620 | | 3/1996 |
| JP | 08-165392 | | 6/1996 |
| JP | 08-239565 | * | 9/1996 |
| JP | 10-007897 | | 1/1998 |

OTHER PUBLICATIONS

Abstract of JP 08165392, JP 06287430, JP 10007897.

* cited by examiner

Primary Examiner—David J. Buttner
(74) Attorney, Agent, or Firm—Oblon, Spivak, McClelland, Maier & Neustadt, P.C.

(57) ABSTRACT

A flame-retardant polycarbonate resin composition comprising either a resin mixture of a polycarbonate resin and a styrenic resin, a functional group-having silicone compound, and a fluoro-olefin resin; or a polycarbonate resin, a functional group-having silicone compound, and a core/shell-type, grafted rubbery elastomer; or a resin mixture of a polycarbonate resin and a styrenic resin, a fluoro-olefin resin, an inorganic filler, and a polycarbonate-polyorganosiloxane copolymer and/or a functional group-having silicone resin, which composition and its moldings, exhibit good flame retardance, good impact resistance, and good thermal stability.

12 Claims, No Drawings

FLAME-RETARDANT POLYCARBONATE RESIN COMPOSITION AND FORMED ARTICLE

This application claims priority to the PCT International Application PCT/JP99/07027 filed Dec. 15, 1999, which was published as WO 00/39217 on Jul. 6, 2000 in a language other than English, which claims priority to Japanese Patent Application No. 10-368391 filed Dec. 25, 1998, Japanese Patent Application No. 10-368392 filed Dec. 25, 1998, and Japanese Patent Application No 11-231118 filed Aug. 18, 1999 the entire contents of these documents are incorporated herein by reference.

TECHNICAL FIELD

The present invention relates to a flame-retardant thermoplastic resin composition. Precisely, the invention relates to a flame-retardant thermoplastic resin composition and its moldings, which do not contain halogen but contain minor additives to exhibit good flame retardancy and have good impact resistance and good thermal stability.

BACKGROUND ART

As having the advantages of impact resistance, heat resistance and good electric properties, polycarbonate resins have many applications in various fields of, for example, OA (office automation) appliances, information and communication appliances, other electric and electronic appliances for industrial use and household use, car parts and building materials. As a rule, polycarbonate resins are self-extinguishable. However, some fields of typically OA appliances, information and communication appliances, and other electric and electronic appliances for industrial use and household use require high flame retardancy, for which are used various flame retardants to improve their flame retardancy.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent tendency toward safety living and environmental protection from discarded and incinerated wastes, the market requires flame retardation with non-halogen flame retardants. As non-halogen flame retardants, phosphorus-containing organic flame retardants, especially organic phosphate compounds may be added to polycarbonate resin compositions, for which various methods have been proposed. Such flame retardants, organic phosphate compounds serve also as a plasticizer, and polycarbonate resin compositions containing them exhibit excellent flame retardancy.

In order to make polycarbonate resins have good flame retardancy by adding thereto a phosphate compound, a relatively large amount of the compound must be added to the resins. In general, polycarbonate resins require relatively high molding temperatures, and their melt viscosity is high. Therefore, for molding them into thin-walled and large-sized moldings, the molding temperature will have to be more and more higher For these reasons, phosphate compounds often cause some problems when added to such polycarbonate resins, though their flame-retarding ability is good. For example, phosphate compounds often corrode molds used for molding resins containing them, and generate gas to have some unfavorable influences on the working environments and even on the appearance of the moldings.

Another problem with phosphate compounds is that, when the moldings containing them are left under heat or in high-temperature and high-humidity conditions, the compounds lower the impact strength of the moldings and yellow the moldings. On the other hand, the recent tendency in the art is toward recycling resin products for saving natural resources. However, as not stable under heat, phosphate compounds are against the requirement for recycling resin products containing them This is still another problem with phosphate compounds.

Apart from the above, known is another technique of adding silicone compounds to polycarbonate resins to make the resins have flame retardancy In this, silicone compounds do not give toxic gas when fired For example, (1) Japanese Patent Laid-Open No 139964/1998 discloses a flame retardant that comprises a silicone resin having a specific structure and a specific molecular weight.

(2) Japanese Patent Laid-Open Nos 45160/1976, 318069/1989, 306265/1994, 12868/1996, 295796/1996, and Japanese Patent Publication No 48947/1991 disclose silicone-containing flame-retardant polycarbonate resins. However, the level of the flame retardant disclosed in (1) is high in some degree, but the impact resistance of resin moldings containing it is often low. The technology of (2) differs from that of (1) in that the silicones used in (2) do not act as a flame retardant by themselves, but are for improving the dropping resistance of resins, and some examples of silicones for that purpose are mentioned. Anyhow, in (2), the resins indispensably require an additional flame retardant of, for example, phosphate compounds or salts of Group 2 metals. Another problem with the resins described in (2) is that the flame retardant added thereto worsens the moldability of the resins and the physical properties of the resin moldings.

Also known is a flame-retardant polycarbonate resin composition that comprises a polycarbonate-polyorganosiloxane copolymer-containing resin (this is one type of polycarbonate resin) and contains a fibril-forming polytetrafluoroethylene (Japanese Patent Laid-Open No 81620/1996). Even though its polyorganosiloxane content is low, falling within a defined range, the composition exhibit good flame retardancy. However, the composition is problematic in that its impact resistance and moldability characteristic of polycarbonate resin are of ten not good. Accordingly, better compositions are desired.

In the current situation as above, the object of the present invention is to provide a polycarbonate resin composition containing a non-halogen flame retardant enough to ensure good flame retardancy and capable of being formed into good moldings having good impact resistance and good thermal stability; and to provide such moldings of the composition.

In the first aspect of the invention, it is intended, in addition to the object mentioned above, to provide a polycarbonate resin composition having good moldability, heat resistance and wet heat resistance and capable of being formed into moldings of good recyclability, and to provide such moldings of the composition.

In the second aspect of the invention, it is intended, also in addition to the object as above, to provide a polycarbonate resin composition capable of being formed into heat-resistant moldings of good recyclability, and to provide such moldings of the composition.

In the third aspect of the invention, it is intended, still in addition to the object as above, to provide a polycarbonate resin composition of good moldability, which does not contain a flame retardant of a phosphorus compound but can be formed into stiff moldings having good thermal stability, and to provide such moldings of the composition.

DISCLOSURE OF THE INVENTION

To attain the object as above of the invention and also to attain the object for the first aspect of the invention, we, the present inventors have assiduously studied and discussed the problem of how to improve the impact resistance, heat resistance and moldability of flame-retardant polycarbonate resins containing a silicone compound that serves as a flame retardant therein. As a result, we have found that a polycarbonate resin composition containing a styrenic resin and containing a specifically selected silicone compound and a specifically selected fluoro resin has good flame retardancy and can be formed into moldings having good impact resistance, heat resistance and wet heat resistance, and that even when the moldings are recycled in a mode of re-melting them and re-molding the resulting melt, the thus-recycled moldings can still have good physical properties and are yellowed little. On the basis of these findings, we have completed the invention.

To attain the object as above of the invention and also to attain the object for the second aspect of the invention, we, the present inventors have further studied and discussed the problem of how to improve the impact resistance and heat resistance of flame-retardant polycarbonate resins containing a silicone compound that serves as a flame retardant therein. As a result, we have found that a polycarbonate resin composition containing, as a flame retardant, a specifically selected silicone compound along with a specifically selected rubbery elastomer has good flame retardancy and can be formed into moldings having good impact resistance and heat resistance, and that even when the moldings are recycled in a mode of re-melting them and re-molding the resulting melt, the thus-recycled moldings can still have good physical properties and are yellowed little. On the basis of these findings, we have completed the invention.

To attain the object as above of the invention and also to attain the object for the third aspect of the invention, we, the present inventors have still further studied and discussed the problem of how to improve the impact resistance, heat resistance and moldability of flame-retardant polycarbonate resins containing a silicone compound that serves as a flame retardant therein. As a result, we have found that a polycarbonate resin composition containing a styrenic resin along with a specific fluoro resin and an inorganic filler and selectively containing a polycarbonate-polyorganosiloxane copolymer and/or a specific silicone resin can effectively attain the intended objects as above. On the basis of these findings, we have completed the invention.

Specifically, the first aspect of the invention is to provide the following:

(1) A flame-retardant polycarbonate resin composition comprising 100 parts by weight of a resin mixture of (A) from 60 to 99% by weight of a polycarbonate resin and (B) from 1 to 40% by weight of a styrenic resin, and from 0.1 to 10 parts by weight of (C) a functional group-having silicone compound, and from 0.02 to 5 parts by weight of (D) a fluoro-olefin resin;

(2) The flame-retardant polycarbonate resin composition of above (1), wherein the polycarbonate resin (A) contains at least a polycarbonate-polyorganosiloxane copolymer, and the polyorganosiloxane content of the polycarbonate resin falls between 0.1 and 10% by weight;

(3) The flame-retardant polycarbonate resin composition of above (1) or (2), wherein the component (A) accounts for from 70 to 95% by weight of the resin mixture, and the component (B) is a rubber-modified styrenic resin and accounts for from 5 to 30% by weight thereof;

(4) A molding of the flame-retardant polycarbonate resin composition of any of above (1) to (3); and (5) An injection molding of the flame-retardant polycarbonate resin composition of any of above (1) to (3), for housings or parts for electric or electronic appliances.

The second aspect of the invention is to provide the following:

(6) A flame-retardant polycarbonate resin composition comprising 100 parts by weight of (A) a polycarbonate resin, from 0.1 to 10 parts by weight of (C) a functional group-having silicone compound, and from 0.2 to 10 parts by weight of (E) a core/shell-type, grafted rubbery elastomer;

(7) The flame-retardant polycarbonate resin composition of above (6), wherein the polycarbonate resin (A) contains at least a polycarbonate-polyorganosiloxane copolymer, and the polyorganosiloxane content of the polycarbonate resin falls between 0.1 and 10% by weight;

(8) The flame-retardant polycarbonate resin composition of above (6) or (7), which further contains from 0.02 to 5 parts by weight of (D) a fluoro-olefin resin;

(9) A molding of the flame-retardant polycarbonate resin composition of any of above (6) to (8); and

(10) An injection molding of the flame-retardant polycarbonate resin composition of any of above (6) to (8), for housings or parts for electric or electronic appliances.

The third aspect of the invention is to provide the following:

(11) A flame-retardant polycarbonate resin composition comprising 100 parts by weight of a resin mixture of (A) from 1 to 99% by weight of a polycarbonate resin and (B) from 1 to 99% by weight of a styrenic resin, from 0.01 to 5 parts by weight of (D) a flucro-olefin resin, from 1 to 100 parts by weight of (F) an inorganic filler, and from 1 to 500 parts by weight of (G) a polycarbonate-polyorganosiloxane copolymer and/or from 0.1 to 10 parts by weight of (C) a functional group-having silicone resin;

(12) The flame-retardant polycarbonate resin composition of above (11), wherein the polyorganosiloxane content derived from the component (C) and/or the component (G) falls between 0.3 and 10% by weight of the composition;

(13) The flame-retardant polycarbonate resin composition of above (11) or (12), wherein the inorganic filler (F) is talc having a mean particle size of from 0.2 to 20 μm;

(14) The flame-retardant polycarbonate resin composition of any of above (11) to (13), wherein the functional group-having silicone compound (C) is an organopolysiloxane having a basic structure of a general formula (1):

$$R^1_a R^2_b SiO_{(4-a-b)/2} \qquad (1)$$

wherein $R^1$ indicates a functional group, $R^2$ indicates a hydrocarbon residue having from 1 to 12 carbon atoms, and a and b are numbers satisfying the relations of $0<a\leq 3$, $0\leq b\leq 3$, and $0<a+b\leq 3$;

(15) The flame-retardant polycarbonate resin composition of any of above (11) to (14), wherein the functional group in the functional group-having silicone compound (C) is selected from an alkoxy group, a vinyl group, a hydride residue, and an epoxy group;

(16) The flame-retardant polycarbonate resin composition of any of above (11) to (15), wherein the functional group in the functional group-having silicone compound (C) is a methoxy group or a vinyl group;

(17) The flame-retardant polycarbonate resin composition of any of above (11) to (16), wherein the fluoro-olefin resin (D) is a fibril-forming polytetrafluoroethylene having a mean molecular weight of at least 500,000;

(18) The flame-retardant polycarbonate resin composition of any of above (11) to (17), wherein the polycarbonate resin (A) has a viscosity-average molecular weight of from 15,000 to 20,000;

(19) A molding of the flame-retardant polycarbonate resin composition of any of above (11) to (18); and

(20) An injection molding of the flame-retardant polycarbonate resin composition of any of above (11) to (18), for housings or parts for electric or electronic appliances.

BEST MODES CF CARRYING OUT THE INVENTION

The invention is described in detail herein under.

(A) Polycarbonate Resin

The polycarbonate resin (PC) serving as the component (A) in the flame-retardant polycarbonate resin composition of the invention is not specifically defined, and may be any and every one known in the art. Generally used herein are aromatic polycarbonates to be produced from diphenols and carbonate precursors. For example, herein used are polycarbonates as produced by reacting a diphenol and a carbonate precursor in a solution method or in a melt method, such as those produced through reaction of a diphenol and phosgene or through interesterification of a diphenol and a diphenyl carbonate.

Varicus diphenols are usable, typically including 2,2-bis (4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis (4-hydroxyphenyl) oxide, bis(4-hydroxyphenyl) sulfide, bis (4-hydroxyphenyl) sulfone, bis(4-hydroxyphenyl) sulfoxide, bis(4-hydroxyphenyl) ether, and bis (4-hydroxyphenyl)ketone.

As the diphenols for use herein, preferred are bis (hydroxyphenyl)alkanes, especially those consisting essentially of bisphenol A. The carbonate precursors for use in the invention include, for example, carbonyl halides, carbonyl esters, and haloformates, concretely, phosgene, diphenol dihaloformates, diphenyl carbonate, dimethyl carbonate, and diethyl carbonate. Other diphenols such as hydroquinone, resorcinol, and catechol are also usable in the invention. The diphenols mentioned herein may be used either singly or as combined.

The polycarbonate resin may have a branched structure, for which the branching agent includes, for example, 1,1,1-tris(4-hydroxyphenyl)ethane, α,α',α"-tris(4-hyroxyphenyl)-1,3,5-triisopropylbenzene, phloroglucine, trimellitic acid, and isatin-bis(o-cresol). For controlling the molecular weight of the polycarbonate resin, for example, employable are phenol, p-t-butylphenol, p-t-octylphenol, and p-cumylphenol.

The polycarbonate resin for use in the invention may be a copolymer such as a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention.

One typical example of the polycarbonate resin copolymer for use in the first and second aspects of the invention is a polycarbonate-polyorganosiloxane copolymer (hereinafter referred to as PC-PDMS copolymer). In the third aspect of the invention, the polycarbonate-polyorganosiloxane copolymer is for the component (G) that will be mentioned herein under.

The PC-PDMS copolymer comprises a polycarbonate moiety and a polyorganosiloxane moiety. For example, this may be prepared by dissolving a polycarbonate oligomer and a polyorganosiloxane having a reactive group at its terminal (this is to form the polyorganosiloxane moiety in the copolymer, and includes, for example, polydimethylsiloxane, polydiethylsiloxane, polymethylphenylsiloxane) in a solvent of, for example, methylene chloride, adding thereto an aqueous solution of bisphenol A containing sodium hydroxide, and reacting them in a mode of interfacial polycondensation in the presence of a catalyst of, for example, triethylamine. Containing the PC-PDMS copolymer, the resin composition of the invention can have better flame retardancy.

In the PC-PDMS copolymer for the component (A), the degree of polymerization of the polycarbonate moiety preferably falls between 3 and 100 or so, and the degree of polymerization of the polydimethylsiloxane moiety preferably falls between 2 and 500 or so. The polydimethylsiloxane content of the PC-PDMS copolymer may generally fall between 0.5 and 30% by weight, but preferably between 1 and 20% by weight.

The viscosity-average molecular weight of the polycarbonate resin and the PC-PDMS copolymer to be used in the first and second aspects of the invention may fall generally between 10,000 and 100,000, but preferably between 11,000 and 30,000, more preferably between12,000 and30,000. On the other hand, the viscosity-average molecular weight of the polycarbonate resin for the component (A) in the third aspect of the invention may fall generally between 10, 000 and 50, 000, but preferably between 13,000 and 35,000, more preferably between 15,000 and 20,000. The viscosity of the resin or the copolymer in a methylene chloride solution at 20° C is measured with an Ubbelohde's viscometer, and the limiting viscosity [η] thereof is derived from it. The viscosity-average molecular weight (Mv) of the resin or the copolymer is calculated according to the following equation:

$$[\eta] = 1.23 \times 10^{-5} \, Mv^{0.83}.$$

The details of the polycarbonate resin for the component (A) in the first and second aspect of the invention are as mentioned above However, in the third aspect of the invention, the PC-PDMS copolymer does not apply to the polycarbonate resin for the component (A). In other words, the component (A) in the third aspect of the invention does not encompass the PC-PDMS copolymer. In the third aspect of the invention, the PC-PDMS copolymer is the component (G) that will be mentioned herein under.

In case where a mixed resin of polycarbonate resin and PC-PDMS copolymer is used in the first and second aspects of the invention, the PC-PDMS copolymer content of the mixed resin preferably falls between 1 and 99% by weight, more preferably between 5 and 50% by weight. Also preferably, the polydimethylsiloxane content of the mixed resin falls between 0.1 and 10% by weight, more preferably between 0.3 and 5% by weight.

(B) Styrenic Resin

In the first and third aspect of the invention, the flame-retardant polycarbonate resin composition indispensably contains a styrenic resin.

The styrenic resin may be a polymer prepared through polymerization of a monomer or monomer mixture of from 20 to 100% by weight of a monovinylic aromatic monomer such as styrene or α-methylstyrene, from 0 to 60% by weight of a vinyl cyanide-type monomer such as acrylonitrile or methacrylonitrile, and from 0 to 50% by weight of any other vinylic monomer copolymerizable with those monomers, such as maleimide, methyl acrylate or methyl methacrylate. The polymer includes, for example, polystyrenes (GPPS), and acrylonitrile-styrene copolymers (AS resins).

As the styrenic resin for the component (B), preferred are rubber-modified styrenic resins. The rubber-modified styrenic resins are preferably impact-resistant styrenic resins produced through grafting polymerization of rubber with at least styrenic monomers. The rubber-modified styrenic resins include, for example, impact-resistant polystyrenes (HIPS) produced through polymerization of rubber such as polybutadiene with styrene; ABS resins produced through polymerization of polybutadiene with acrylonitrile and styrene NIBS resins produced through polymerization of polybutadiene with methyl methacrylate and styrene. These rubber-modified styrenic resins may be combined, or may be mixed with other styrenic resins not modified with rubber such as those mentioned above, and the resin mixtures may be used in the invention.

In the rubber-modified styrenic resins, the amount of rubber to modify them may fall, for example, between 2 and 50% by weight, but preferably between 5 and 30% by weight, more preferably between 5 and 15% by weight. If the rubber content is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of rubber for use herein include polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, and ethylene-propylene rubber. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

In the first aspect of the invention, a styrenic resin is combined with a polycarbonate resin to form the flame-retardant polycarbonate resin composition, in which the styrenic resin is to improve the melt fluidity of the resin composition. In the resin mixture of the polycarbonate resin (A) and the styrenic resin (B) in the composition, the amount of the polycarbonate resin (A) is from 60 to 99% by weight, preferably from 70 to 95% by weight, and that of the styrenic resin (B) is from 1 to 40% by weight, preferably from 5 to 30% by weight. If the amount of the polycarbonate resin of the component (A) constituting the resin mixture is smaller than 60% by weight, the heat resistance and the strength of the moldings of the composition will be poor. On the other hand, if the amount of the styrenic resin of the component (B) is smaller than 1% by weight, the styrenic resin could not satisfactorily exhibit its ability to improve the moldability of the composition. For the styrenic resin (B), preferred are rubber-modified styrenic resins such as those mentioned hereinabove. The ratio of the two resins constituting the resin mixture may be suitably determined, depending on the molecular weight of the polycarbonate resin, on the type, the molecular weight, the melt index and the rubber content of the styrenic resin, and on the use, the size and the thickness of the moldings to be formed from the composition.

Also in the third aspect of the invention, a styrenic resin is combined with a polycarbonate resin to form the flame-retardant polycarbonate resin composition, in which the styrenic resin is to improve the melt fluidity of the resin composition. In the resin mixture of the two resins in the composition, the amount of the polycarbonate resin (A) is from 1 to 99% by weight, preferably from 50 to 90% by weight, and that of the styrenic resin (B) is from 1 to 99% by weight, preferably from 10 to 50% by weight.

(C) Functional group-having Silicone Compound

The functional group-having silicone compound for the component (C) in the invention is a functional group-having polyorganosiloxane or organosiloxane, of which the skeleton is a polymer, copolymer or monomer having a basic structure of a formula, $R^1{}_a R^2{}_b SiO_{(4-a-b)/2}$ (wherein $R^1$ indicates a functional group, $R^2$ indicates a hydrocarbon residue having from 1 to 12 carbon atoms, and $0 < a \leq 3$, $0 \leq b < 3$, and $0 < a+b \leq 3$).

The functional group includes, for example, an alkoxy group, an aryloxy group, a polyoxyalkylene group, a hydride residue, a hydroxyl group, a carboxyl group, a silanol group, an amino group, a mercapto group, an epoxy group, and a vinyl group. Of those, preferred are an alkoxy group, an aryloxy group, an epoxy group, and a vinyl group and more preferred are a methoxy group and a vinyl group.

The silicone compound for use herein may have a plurality of different functional groups; or a plurality of silicone compounds having different functional groups may be combined for use herein. In the functional group-having silicone compound, the ratio of functional group ($R^1$)/hydrocarbon residue ($F^2$) generally falls between 0.1 and 3 or so, but preferably between 0.3 and 2 or so.

The functional group-having silicone compound is liquid or powdery, but is preferably well dispersible in the other constituent components while they are kneaded in melt For example, in the first and second aspects of the invention, the compound may be liquid at room temperature, having a viscosity at room temperature of from 1,000 to 500,000 cst or so; and in the third aspect of the invention, the compound may be liquid, having a viscosity of from 10 to 500,000 cst or so. The polycarbonate resin composition of the invention is characterized in that the silicone compound for the component (C) uniformly disperses in the composition even when it is liquid, and that the compound bleeds little out of the composition being molded and out of the moldings of the composition.

In the first aspect of the invention, the resin composition contains from 0.1 to 10 parts by weight, preferably from 0.2 to 5 parts by weight of the functional group-having silicone compound, relative to 100 parts by weight of the resin mixture of the polycarbonate resin (A) and the styrenic resin (B) therein. In the second aspect of the invention, the resin composition contains from 0.1 to 10 parts by weight, preferably from 0.2 to 5 parts by weight of the functional group-having silicone compound, relative to 100 parts by weight of the polycarbonate resin (A) therein. In case where the polycarbonate resin in the resin composition is PC-PDMS copolymer, the functional group-having silicone compound content of the resin composition shall be suitably determined in consideration of the silicone content thereof Specifically, the PC-PDMS copolymer-containing polycarbonate resin composition is advantageous in that the functional group-having silicone compound content of the composition may be reduced, and that the flame retardancy level of the composition is still high even when the silicone content of the composition is lowered.

In the third aspect of the invention, the content of the functional group-having silicone compound for the component (C) in the resin composition falls between 0.1 and 10 parts by weight, preferably between 0.2 and 5 parts by weight, relative to 100 parts by weight of the resin mixture of the components (A) and (B) therein. If the content of the compound for the component (C) is too small in the composition, the compound will be ineffective for improving the flame retardancy of the composition but even if too much, the compound will be no more effective for improving it.

(D) Fluoro-olefin Resin

The flame-retardant polycarbonate resin composition in the first and third aspects of the invention additionally contains a fluoro-olefin resin for the component (D), which exhibits a resin melt-dropping preventing effect when the composition is fired. The fluoro-olefin resin (D) is generally a polymer or copolymer having a fluoro-ethylenic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. Any and every type of polytetrafluoroethylene known at present in the art is usable in the invention.

Mores preferred for use herein is polytetrafluoroethylene having the ability to form fibrils, as its property of preventing resin melts from dropping is better. The fibril-forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201 (all from Daikin Industry), and CD076 (from Asahi ICI Fluoropolymers).

Others except PTFE of Type 3 are also employable herein, including, for example, Argoflon F5 (from Montefluos), Polyflon MPA and Polyflon FA-100 (both from Daikin Industry). These polytetrafluoroethylenes (PTFEs) may be used either singly or as combined. The fibril-forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefin resin content of the resin composition in the first aspect of the invention falls between 0.02 and 5 parts by weight, preferably between 0.05 and 2 parts by weight, relative to 100 parts by weight of the resin mixture of (A) and (B) in the composition. If the fluoro-olefin resin content is smaller than 0.02 parts by weight, the resin melt-dropping preventing ability of the composition will be not enough for the intended flame retardancy of the composition However, even if the content is larger than 5 parts by weight, the effect of the fluoro-olefin resin added could not be augmented any more, and such a large amount of the fluoro-olefin resin, if added to the composition, will have some negative influences on the impact resistance and the outward appearance of the moldings of the composition. Therefore, the amount of the fluoro-olefin resin to be added to the composition may be suitably determined, depending on the necessary flame retardancy of the moldings of the composition, for example, based on V-0, V-1 or V-2 in UL-94, and depending on the amount of the other constituent components.

In the third aspect of the invention, the fluoro-olefin resin content of the resin composition falls between 0.01 and 5 parts by weight, preferably between 0.05 and 3 parts by weight, relative to 100 parts by weight of the resin mixture of (A) and (B) in the composition. If the fluoro-olefin resin content is too small, the resin melt-dropping preventing ability of the composition will be not enough for the intended flame retardancy of the composition. However, even if too large, the effect of the fluoro-olefin resin added could not be augmented any more, and such a large amount of the fluoro-olefin resin, if added to the composition, will have some negative influences on the impact resistance and the outward appearance of the moldings of the composition. Therefore, the amount of the fluoro-olefin resin to be added to the composition may be suitably determined, depending on the necessary flame retardancy of the moldings of the composition, for example, based on V-0, V-1 or V-2 in UL-94, and depending on the amount of the other constituent components.

In the second aspect of the invention, the flame-retardant polycarbonate resin composition comprising the three components of (A) and (B) mentioned above and (E) to be mentioned herein under well attains the object of the invention to improve the flame retardancy and the impact resistance of the moldings of the composition. However, for preventing resin melts from dropping when the resin composition is fired, the composition may contain a known resin melt-dropping preventing agent. For the resin melt-dropping prevent agent that may be in the composition, preferred is the fluoro-olefin resin mentioned hereinabove for the component (D).

In the second aspect of the invention, the fluoro-olefin resin content of the composition may fall between 0.02 and 5 parts by weight, but preferably between 0.05 and 2 parts by weight, relative to 100 parts by weight of the resin component (A) in the composition. If the fluoro-olefin resin content is smaller than 0.02 parts by weight, the resin melt-dropping preventing ability of the composition will be not good. However, even if the content is larger than 5 parts by weight, the effect of the fluoro-olefin resin added could not be augmented anymore, and such a large amount of the fluoro-olefin resin, if added to the composition, will have some negative influences on the impact resistance and the outward appearance of the moldings of the composition. Therefore, the amount of the fluoro-olefin resin to be added to the composition may be suitably determined, depending on the necessary flame retardancy of the moldings of the composition, for example, based on V-0, V-1 or V-2 in UL-94, and depending on the amount of the other constituent components.

(E) Core/shell-type, Grafted Rubbery Elastomer

In the second aspect of the invention, the component (E), core/shell-type, grafted rubbery elastomer is indispensable in the flame-retardant polycarbonate resin composition, and this is described herein under. The core/shell-type, grafted rubber-like elastomer for the component (E) has a two-layered structure composed of a core and a shell, in which the core is of a flexible rubber material and the shell that covers the core is of a hard resin material. As a whole, the elastomer itself is powdery or granular. After blended with a polycarbonate resin in melt, the core/shell-type, grafted rubbery elastomer mostly keeps its original powdery or granular condition. Since the grafted rubbery elastomer keeps its original powdery or granular condition after having been blended with the resin melt, it can uniformly disperse in the resin composition and is effective for preventing the moldings of the resin composition from being troubled by surface layer peeling.

Known are various core/shell-type, grafted rubbery elastomers that are usable herein. Commercially-available products of such elastomers include, for example, Hiblen B621 (from Nippon Zeon), KM-330 (form Rohm & Haas), Metablen W529, Metablen S2001, Metablen. C223, Metablen B621 (all from Mitsubishi Rayon).

Above all, preferred are those to be produced through polymerization of one or more vinylic monomers in the presence of a rubber-like polymer that is obtained from monomers of essentially alkyl acrylates or alkyl methacrylates and dimethylsiloxane. In the alkyl acrylates and acryl methacrylates, the alkyl group preferably has from 2 to 10 carbon atoms. Concretely, the alkyl acrylates and methacrylates include, for example, ethyl acrylate, butyl acrylate, 2-ethylhexyl acrylate, and n-octyl methacrylate. One example of the rubbery elastomers obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, and styrene. To prepare the polymer, a polyfunctional monomer serving as a crosslinking agent, such as divinylbenzene, ethylene dimethacrylate, triallyl cyanurate, or triallyl isocyanurate, may be added to the polymerization system.

The vinylic monomers to be polymerized in the presence of a rubber-like polymer include, for example, aromatic vinyl compounds such as styrene, x-methylstyrene acrylates such as methyl acrylate, ethyl acrylate; and methacrylates such as methyl methacrylate, ethyl methacrylate. One or more these monomers may be (co)polymerized, as combined, or may be copolymerized with any other vinylic monomers such as vinyl cyanide compounds (e.g., acrylonitrile, methacrylonitrile), and vinyl esters (e.g., vinyl acetate, vinyl propionate). The (co)polymerization may be effected in any known method of, for example, bulk polymerization, suspension polymerization, or emulsion polymerization. Preferred is emulsion polymerization.

It is desirable that the core/shell-type, grafted rubbery elastomers thus produced in the manner mentioned above contain at least 20% by weight of the rubber-like polymer moiety. Typical examples of the core/shell-type, grafted rubbery elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with that least one vinylic monomer, in which the composite rubber comprises from 5 to 95% by weight of a polysiloxane rubber component and from 5 to 95% by weight of a acrylacrylate or acrylmethacrylate rubber component as so entangled that they are not separated from each other, and has a mean particle size of from 0.01 to 1 $\mu$m or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen. S-2001 from Mitsubishi Rayon.

In the second aspect of the invention, the content of the component (E), core/shell-type, grafted rubbery elastomer in the resin composition falls between 0.2 and 10 parts by weight, preferably between 0.5 and 5 parts by weight, relative to 100 parts by weight of the polycarbonate resin (A) therein. If the grafted rubbery elastomer content of the resin composition is smaller than 0.2 parts by weight, the moldings of the composition will be poor; but if larger than 10% by weight, the flame retardancy, heat resistance and stiffness of the moldings of the composition will be poor. In general, the elastomer content of up to 10 parts by weight will be enough. In the second aspect of the invention, the polycarbonate resin composition can exhibit its excellent characteristics only when it contains a relatively small amount of the component (C), functional group-having silicone compound and a relatively small amount of the component (E), core/shell-type, grafted rubbery elastomer. In case where the resin composition contains any other graft copolymer, not the core/shell-type, grafted rubbery elastomer, its moldings could have improved impact-resistant strength, but could hardly keep the level of flame retardancy which is the final object of the invention.

(F) Inorganic Filler

In the third aspect of the invention, the inorganic filler for the component (F) is indispensable to the resin composition for improving the stiffness and the flame retardancy of the moldings of the composition. The inorganic filler includes, for example, talc, mica, kaolin, diatomaceous earth, calcium carbonate, calcium sulfate, barium sulfate, glass fibers, carbon fibers, and potassium titanate fibers. Especially preferred for use herein are tabular fillers of, for example, talc and mica, and fibrous fillers. Talc is a magnesium silicate hydrate, and this is available on the market. The inorganic filler such as talc for use herein may have a mean particle size of from 0.1 to 50 $\mu$m, but preferably from 0.2 to 20 $\mu$m. The inorganic filler, especially talc in the resin composition is effective for further enhancing the stiffness of the moldings of the composition, and, as the case may be, it will be able to reduce the amount of the silicone compound to be in the composition.

In the third aspect of the invention, the inorganic filler content of the resin composition falls between 1 and 100 parts by weight, preferably between 2 and 70 parts by weight, relative to 100 parts by weight of the resin mixture of (A) and (B) in the composition. If its amount is too small, the inorganic filler added could not satisfactorily exhibit its effect of enhancing the stiffness and the flame retardancy of the moldings of the composition; but if too large, the impact resistance of the moldings will lower and the melt fluidity of the composition will lower. The amount of the inorganic filler to be in the composition may be suitably determined, depending on the necessary properties of the moldings and the moldability of the composition, especially on the thickness of the moldings and the spiral flow length of the composition.

In the third aspect of the invention, the resin composition contains the components (A), (B), (D), (F), and the components (C) and/or (G).

(G) Polycarbonate-polyorganosiloxane Copolymer

The polycarbonate-polyorganosiloxane copolymer (hereinafter referred to as PC-polyorganosiloxane copolymer) for the component (G) in the third aspect of the invention comprises a polycarbonate moiety and a polyorganosiloxane moiety. For example, this may be prepared by dissolving a polycarbonate oligomer and a polyorganosiloxane having a reactive group at its terminal (this is to form the polyorganosiloxane moiety in the copolymer, and includes, for example, polydimethylsiloxane, polydiethylenesiloxane, polymethylphenylsiloxane) in a solvent of, for example, methylene chloride, adding thereto an aqueous solution of bisphenol. A containing sodium hydroxide, and reacting them in a mode of interfacial polycondensation in the presence of a catalyst of, for example, triethylamine.

In the PC-polyorganosiloxane copolymer, the degree of polymerization of the polycarbonate moiety preferably falls between 3 and 100 or so, and the degree of polymerization of the polydimethylsiloxane moiety preferably falls between 2 and 500 or so. The polydimethylsiloxane content of the PC-polyorganosiloxane copolymer may generally fall between 0.5 and 30% by weight, but preferably between 1 and 20% by weight. The viscosity-average molecular weight of the PC-polyorganosiloxane copolymer for the component (G) may fall generally between 5,000 and 100,000, but preferably between 10,000 and 30,000, more preferably between 12,000 and 30,000. The viscosity-average molecular weight (Mv) of the copolymer may be obtained in the same manner as that for the polycarbonate resin mentioned hereinabove.

In the third aspect of the invention, the content of the component (G), PC-polyorganosiloxane copolymer to be in the resin composition falls between 1 and 500 parts by weight, preferably between 5 and 450 parts by weight, relative to 100 parts by weight of the resin mixture of (A) and (B) therein. If its amount is too small in the composition, the copolymer will be ineffective for improving the flame retardancy of the composition; but even if too much, the copolymer will be no more effective for improving it.

In the third aspect of the invention, it is desirable that the polyorganosiloxane content derived from the components (C) and/or (G) in the flame-retardant polycarbonate resin composition is controlled to fall between 0.3 and 10% by weight, more preferably between 0.5 and 5% by weight. If the polyorganosiloxane content of the composition is smaller than 0.3% by weight, the flame retardancy of the composition will be poor but if larger than 10% by weight, the impact resistance and the heat resistance of the composition will be poor.

Next, other components that may be optionally in the flame-retardant polycarbonate resin composition are described below.

In the first aspect of the invention, the flame-retardant polycarbonate resin composition may optionally contain other thermoplastic resins such as polyester resins, or inorganic fillers for improving the stiffness and also the flame retardancy of the moldings of the composition. For the examples of the inorganic filler that may be in the composition, referred to are those of the component (D) mentioned hereinabove. For the details of the preferred examples of the filler, the mean particle size and the effect of the filler, also referred to are those of the component (D).

In the second aspect of the invention, the flame-retardant polycarbonate resin composition may optionally contain an inorganic filler for improving the stiffness and also the flame retardancy of the moldings of the composition. For the examples of the inorganic filler that may be in the composition, referred to are those of the component (D) mentioned hereinabove. For the details of the preferred examples of the filler, the mean particle size and the effect of the filler, also referred to are those of the component (D)

The inorganic filler content of the resin composition may fall between 1 and 100 parts by weight, but preferably between 2 and 50 parts by weight, relative to 100 parts by weight of the resin mixture of the polycarbonate resin (A) and the styrenic resin (B) in the first aspect of the invention, and relative to 100 parts by weight of the polycarbonate resin (A) in the second aspect thereof. If the inorganic filler content is smaller than 1 part by weight, the intended stiffness and the flame retardancy of the resin moldings will be poor but if larger than 100 parts by weight, the impact resistance of the resin moldings will be poor and, in addition, the melt fluidity of the resin composition will be poor. The amount of the inorganic filler to be in the composition may be suitably determined, depending on the necessary properties of the moldings and the moldability of the composition, especially on the thickness of the moldings and the spiral flow length of the composition.

The flame-retardant polycarbonate resin composition in the third aspect of the invention may contain, in addition to the above-mentioned components (A) to (D), and (F) and (G), any other synthetic resins and elastomers for further improving the moldability of the composition and improving the impact resistance, the outward appearance, the weather resistance and the stiffness of the moldings of the composition.

In the first aspect of the invention, the flame-retardant polycarbonate resin composition may contain, in addition to the essential components (A) to (D), any additives which are generally added to ordinary thermoplastic resins, if desired. The additives are for further improving the moldability of the composition and for further improving the impact resistance, the outward appearances, the weather resistance and the stiffness of the moldings of the composition. They include, for example, phenolic, phosphorus-containing or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), plasticizers, microbicides, compatibilizers, and colorants (dyes, pigments). For their amount, the optional additives that may be in the flame-retardant polycarbonate resin composition of the invention are not specifically defined, provided that they do not interfere with the properties of the composition.

In the second aspect of the invention, the flame-retardant polycarbonate resin composition may also contain, in addition to the essential components (A), (C) and (E), one or more optional components including (D), as well as other thermoplastic resins such as polyester resins, and also still other additives which are generally added to ordinary thermoplastic resins, if desired. The optional components and additives are for further improving the moldability of the composition and for further improving the impact resistance, the outward appearances, the weather resistance and the stiffness of the moldings of the composition. For their details, referred to are the same as those mentioned hereinabove for the composition in the first aspect of the invention. For their amount, also referred to are the same as those mentioned hereinabove for the composition in the first aspect of the invention.

Also in the third aspect of the invention, the flame-retardant polycarbonate resin composition may optionally contain the additives that are generally added to ordinary thermoplastic resins, if desired. For the details of the optional additives, referred to are the same as those mentioned hereinabove for the composition in the first aspect of the invention. However, phosphorus-containing compounds such as phosphorus-containing antioxidants are unfavorable to the composition in the third aspect of the invention, as being against the object of the invention. For the amount of the optional additives that may be in the composition, also referred to are the same as those mentioned hereinabove for the composition in the first aspect of the invention.

Methods for producing the flame-retardant polycarbonate resin composition of the invention are described. In the first aspect of the invention, the flame-retardant polycarbonate resin composition may be produced by mixing and kneading the components (A) to (D) in a predetermined ratio as above, optionally along with the optional components and additives as above in any desired ratio. In the second aspect of the invention, the flame-retardant polycarbonate resin composition may be produced by mixing and kneading the components (A), (C) and (E) in a predetermined ratio as above, optionally along with the optional components and additives as above in any desired ratio. In the third aspect of the invention, the flame-retardant polycarbonate resin composition may be produced by mixing and kneading the components (A), (B), (D), (F), and (C) and/or (G) in a predetermined ratio as above, optionally along with the optional components and additives as above in any desired ratio.

Formulating and mixing the constituent component into the intended resin composition may be effected in any known manner, for example, by pre-mixing them in an ordinary device, such as a ribbon blender or a drum tumbler, followed by further kneading the resulting pre-mix in a Henschel mixer, a Banbury mixer, a single-screw extruder, a double-screw extruder, a multi-screw extruder, or a coknead. The temperature at which the components are mixed and kneaded generally falls between 240 and 300° C. For molding the melt mixture, preferably used is an extrusion molding machine, more preferably a vented extruder Other constituent components than polycarbonate resin may be previously mixed with polycarbonate resin or with any other thermoplastic resin to prepare a master batch, and it may be added to the other constituent components.

Having been prepared in the manner noted above, the flame-retardant polycarbonate resin composition of the invention may be molded into various moldings in the melt-molding devices as above, or, after it is pelletized, the resulting pellets may be molded into various moldings through injection molding, injection compression molding, extrusion molding, blow molding, pressing, vacuum forming or foaming. Especially preferably, the composition is pelletized in the melt-kneading manner as above, and the resulting pellets are molded into moldings through injection molding or injection compression molding. For injection molding of the composition, preferred is a gas-introducing molding method so as to prevent shrinkage cavity around the moldings and to reduce the weight of the moldings.

Moldings of the flame-retardant polycarbonate resin composition of the invention are usable for various housings and parts for electric and electronic appliances, such as duplicators, facsimiles, televisions, radios, tape recorders, video decks, personal computers, printers, telephones, information terminals, refrigerators, and microwave ovens. The moldings have still other applications, and are usable, for example, as car parts.

The invention is described more concretely with reference to the following Examples and Comparative Examples, which, however, are not intended to restrict the scope of the invention.

EXAMPLES 1 to 5, and COMPARATIVE EXAMPLES 1 to 5

The components shown in Table 1 and Table 2 were blended in the ratio indicated therein (the components (A) and (B) are in terms of % by weight, and the other components are in terms of parts by weight relative to 100 parts by weight of the total of (A) and (B)), fed into a vented double-screw extruder (TEM35 from Toshiba Kikai), melted and kneaded therein at 2600C, and then pelletized. To all compositions of Examples and Comparative Examples, added were 0.2 parts by weight of. Irganox 1076 (from Ciba Specialty Chemicals) and 0.1 parts by weight of Adekastab C (from Asahi Denka Industry) both serving as an antioxidant. The resulting pellets were dried at 120° C. for 12 hours, and then molded into test pieces in a mode of injection molding at 260° C. The mold temperature was 80° C. These test pieces were tested for their properties in various test methods, and their data obtained are given in Table 1 and Table 2.

The materials used for producing the test samples, and the methods for testing the samples are mentioned below.

Details of Constituent Components (A) Polycarbonate Resin:
PC-1 Toughlon A1900 (from Idemitsu Petrochemical).
This is a bisphenol. A polycarbonate resin having an MI of 20 g/10 min (at 300° C., under a load of 1.2 kg), and a viscosity-average molecular weight of 19,000.
PC-PDMS-1;
This is a bisphenol. A-polydimethylsiloxane (PDMS) copolymer having an MI of 45 g/10 min (at 300° C., under a load of 1.2 kg), a PDMS chain length (n) of 30, a PDMS content of 4% by weight, and a viscosity-average molecular weight of 20,000 (prepared according to the method of Example 3-1 (Al) in Japanese Patent Laid-Open No 81620/1996).

(B) Styrenic Resin:
HIPS Impact-resistant polystyrene resin (IDEMITSU-PS-IT44 from Idemitsu Petrochemical).
This is a styrene-grafted polybutadiene having a rubber content of 10% by weight and an MI of 8 g/10 min (at 200° C., under a load of 5 kg).
ABS Acrylonitrile-butadiene-styrene copolymer (DP-611 from Technopolymer), having an MI of 2 g/10 min.

(C) Functional Group-having, or Functional Group-free Silicone Compound:
Silicone-1 KR219 (from Shin-etsu Chemical Industry).
This is methylphenylsilicone with vinyl and methoxy groups, having a viscosity of 1,800 cst.
Silicone-2: KC-89 (from Shin-etsu Chemical Industry).
This is methoxy group-having dimethylsilicone, having a viscosity of 2,000 cst.
Silicone-3; SH200 (from Toray-Dow Corning).
This is dimethylsilicone, having a viscosity of 35,000 cst.

(D) Fluoro-olefin Resin:
PTFE CD076 (from Asahi Glass).

(H) Flame Retardant:
TBA Oligomer FG7500 (from Teijin. Chemical).
This is tetrabromobisphenol. A oligomer.
Phosphate PFR (from Asahi Denka).
This is resorcinol bis(diphenylphosphate).

Test Methods (1) Melt Fluidity:
MI (melt index) of each sample is measured at 260° C. under a load of 2.16 kg, according to JIS K7210. The data are in terms of g/10 min.

(2) IZOD Impact Strength:
Measured according to ASTM D256. The temperature is 23° C., and the thickness of samples is ⅛ inches. The data are in terms of $kJ/m^2$.

(3) Deflection Temperature Under Heat:

Measured according to JIS K7207 (method A), under a bending stress of 18.5 kg/cm$^2$. The data are in terms of °C.

(4) Flame Retardancy:

Tested according to the UL94 combustion test. Samples tested have a thickness of 2.5 mm.

(5) Recyclability:

Resin composition pellets are molded in a mode of injection molding at 280° C. into housings for portable personal computers (of A4 size). The mold temperature is 80° C. The housings are ground, and 100% recycled into test pieces molded in the same manner as previously. The recycled test pieces are tested for their properties in the manner as below.

1. IZOD Impact Strength:

Measured according to the test method (2) as above.

2. Yellowing:

The color (L, a, b) of the original test pieces and that of the recycled test pieces are measured with a calorimeter, according to JIS H7103 (test method for yellowing). From the data, obtained is the color difference, ΔE between the original test pieces and the recycled test pieces. This indicates the degree of yellowing of the recycled test pieces.

(6) Heat Resistance:

Test pieces are kept at a temperature of 70° C. and at a humidity of 90% for 300 hours.

1. The IZOD impact strength of the thus-aged test pieces is measured in the same manner as above.
2. The color difference between the non-aged test pieces and the aged test pieces is obtained in the same manner as above.

TABLE 1

|  | Example 1 | Comp. Ex. 1 | Comp. Ex. 2 | Example 2 | Comp. Ex. 3 |
|---|---|---|---|---|---|
| Composition |  |  |  |  |  |
| (A) |  |  |  |  |  |
| PC-1 | 90 | 90 | 90 | 80 | 80 |
| PC-PDMS-1 | — | — | — | — | — |
| (B) |  |  |  |  |  |
| HIPS | 10 | 10 | 10 | — | — |
| ABS | — | — | — | 20 | 20 |
| (C) |  |  |  |  |  |
| Silicone-1 | 4 | — | — | 4 | — |
| Silicone-2 | — | — | — | — | — |
| Silicone-3 | — | — | 4 | — | — |
| (D) |  |  |  |  |  |
| PTFE | 0.5 | 0.5 | 0.5 | 0.3 | 0.3 |
| (H) |  |  |  |  |  |
| Phosphate | — | — | — | — | 8 |
| TBA oligomer | — | — | — | — | — |
| Silicone(*) content of resin (A) | 0 | 0 | 0 | 0 | 0 |
| Total silicone(*) content (wt. %) | 4 | 0 | 4 | 4 | 0 |
| Silicone(*) ratio = (A)/(C) | 0 | 0 | 0 | 0 |  |
| Test Data |  |  |  |  |  |
| (1) Melt fluidity: MI | 8 | 5 | 10 | 10 | 25 |
| (2) IZOD impact strength | 65 | 70 | 50 | 70 | 60 |
| (3) Deflection temperature under heat | 120 | 122 | 118 | 120 | 95 |
| (4) UL-94 | V-0 | V-2 over | V-2 over | V-1 | V-1 |
| (5) Recyclability |  |  |  |  |  |
| 1. IZOD impact strength | 65 | — | — | 70 | 55 |
| 2. Yellowing | 0.2 | — | — | 0.5 | 0.4 |
| (6) Heat resistance |  |  |  |  |  |
| 1. IZOD impact strength | 60 | — | — | 60 | 15 |
| 2. Yellowing | 0.6 | — | — | 1.2 | 1.4 |

(*)Polyorganosiloxane.
(**)V-2 over: not corresponding to any of V-0, V-1 or V-2.

TABLE 2

|  | Comp. Ex. 4 | Example 3 | Example 4 | Example 5 | Comp. Ex. 5 |
|---|---|---|---|---|---|
| Composition |  |  |  |  |  |
| (A) |  |  |  |  |  |
| PC-1 | 80 | 65 | 35 | 30 | 10 |
| PC-PDMS-1 | — | 25 | 50 | 50 | 80 |

TABLE 2-continued

|  | Comp. Ex. 4 | Example 3 | Example 4 | Example 5 | Comp. Ex. 5 |
|---|---|---|---|---|---|
| (B) | | | | | |
| HIPS | — | 10 | 15 | — | 10 |
| ABS | 20 | — | — | 20 | — |
| (C) | | | | | |
| Silicone-1 | — | 2 | — | 2 | — |
| Silicone-2 | — | — | 2 | — | — |
| Silicone-3 | — | — | — | — | — |
| (D) | | | | | |
| PTFE | 0.3 | 0.5 | 0.3 | 0.3 | 0.5 |
| (H) | | | | | |
| Phosphate | — | — | — | — | — |
| TBA oligomer | 10 | — | — | — | — |
| Silicone(*) content of resin (A) | 0 | 1 | 2 | 2 | 3.2 |
| Total silicone(*) content (wt. %) | 0 | 3 | 4 | 4 | 3.2 |
| Silicone(*) ratio = (A)/(C) | — | 0.5 | 1 | 1 | — |
| Test Data | | | | | |
| (1) Melt fluidity: MI | 15 | 6 | 14 | 12 | 5 |
| (2) IZOD impact strength | 65 | 75 | 55 | 75 | 75 |
| (3) Deflection temperature under heat | 123 | 120 | 118 | 121 | 123 |
| (4) UL-94 | V-1 | V-0 | V-0 | V-0 | V-1 |
| (5) Recyclability | | | | | |
| 1. IZOD impact strength | 40 | 70 | 50 | 75 | 70 |
| 2. Yellowing | 3.2 | 0.3 | 0.4 | 0.6 | 0.3 |
| (6) Heat resistance | | | | | |
| 1. IZOD impact strength | 50 | 65 | 45 | 65 | 60 |
| 2. Yellowing | 1.9 | 0.6 | 1.2 | 0.9 | 0.5 |

(*)Polyorganosiloxane.

Regarding the flame-retardant polycarbonate resin composition in the first aspect of the invention, the following matters are obvious from the data in Table 1 and Table 2. The moldings of Example 1 are compared with those of Comparative Examples 1 and 2, and it is obvious that the former have good flame retardancy and impact resistance. The moldings of Example 2 are compared with those of Comparative Examples 3 and 4, and it is obvious that the flame retardancy of the former is on the same level as that of the comparative samples containing a phosphate or halogen compound that serves as a flame retardant, and that the former all have good physical properties. In addition, it is obvious that the moldings of the invention all have good heat resistance and good recyclability. It is understood that, when PC-PDMS copolymer is used for the polycarbonate resin in the composition of the invention, the total silicon content of the composition can be reduced.

EXAMPLES 6 to 8, and COMPARATIVE EXAMPLES 6 to 12

The components shown in Table 3 and Table 4 were blended in the ratio indicated therein (the component (A) is in terms of % by weight, and the other components are in terms of parts by weight relative to 100 parts by weight of (A)), fed into a vented double-screw extruder (TEM35 from Toshiba Kikai), melted and kneaded therein at 280° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 120° C. for 12 hours, and then molded into test pieces in a mode of injection molding at 270° C. The mold temperature was 80° C. These test pieces were tested for their properties in various test methods, and their data obtained are given in Table 1.

The materials used for producing the test samples, and the methods for testing the samples are mentioned below.

Details of Constituent Components (A) Polycarbonate resin:
PC-2. Toughlon A1700 (from Idemitsu Petrochemical).
This is a bisphenol. A polycarbonate resin having an MI of 27 g/10 min (at 300° C., under a load of 1.2 kg), and a viscosity-average molecular weight of 17,000.
PC-PDMS-2:
This is a bisphenol A-polydimethylsiloxane (PDMS) copolymer having an MI of 45 g/10 min (at 300° C., under a load of 1.2 kg), a PDMS chain length (n) of 30, a PDMS content of 4% by weight, and a viscosity-average molecular weight of 15,000 (prepared according to the method of Example 3-1 (A2) in Japanese Patent Laid-Open No 81620/1996).

(C) Functional Group-having, or Functional Group-free Silicone Compound:
Silicone-1: as above.
Silicone-2: as above.
Silicone-3: as above.

(E) Core/Shell-type, Grafted Rubbery Elastomer:
Rubbery elastomer-1: Metablen S2001 (from Mitsubishi Rayon).
This is a composite rubber-like graft copolymer, having a polydirnethylsiloxane content of at least 50% by weight.
Rubbery elastomer-2: Metablen. C223 (from Mitsubishi Rayon).
This is an MBS-type graft copolymer, having a polybutadiene content of at least 60% by weight.
Rubbery elastomer-3: VECTOR8550-5 (from Dexo Polymers).
This is an SBS-type graft copolymer, and not a core/shell-type grafted rubbery elastomer.

(D) Fluoro-olefin Resin:
   PTFE CD076 (as above).
(H) Halogen-containing Flame Retardant:
   TBA oligomer: as above.

Test Methods (1) Melt Fluidity:
   MI (melt index) of each sample is measured at 300° C. under a load of 1.2 kg, according to JIS K7210. The data are in terms of g/10 min.

(2) IZOD Impact Strength:
   As mentioned above.

(3) Flame Retardancy:
   Tested according to the UL94 combustion test. Samples tested have a thickness of 1.5 mm.

(4) Recyclability:
   As mentioned above.

TABLE 3

|  | Example 6 | Comp. Ex. 6 | Comp. Ex. 7 | Example 7 | Example 8 |
|---|---|---|---|---|---|
| Composition |  |  |  |  |  |
| (A) |  |  |  |  |  |
| PC-2 | 100 | 100 | 100 | 75 | 50 |
| PC-PDMS-2 | 0 | 0 | 0 | 25 | 50 |
| (C) |  |  |  |  |  |
| Silicone-1 | 3 | — | 3 | 1 | — |
| Silicone-2 | — | — | — | — | 0.5 |
| Silicone-3 | — | — | — | — | — |
| (E) |  |  |  |  |  |
| Rubbery elastomer-1 | 1 | — | — | 2 | — |
| Rubbery elastomer-2 | — | — | — | — | 1 |
| Rubbery elastomer-3 | — | — | — | — | — |
| (D) |  |  |  |  |  |
| PTFE | 0.5 | 0.5 | 0.5 | 0.3 | 0.3 |
| (H) |  |  |  |  |  |
| TBA oligomer | — | — | — | — | — |
| Silicone(*) content of resin (A) | 0 | 0 | 0 | 1 | 2 |
| Total silicone(*) content (wt. %) | 3 | 0 | 3 | 2 | 2.5 |
| Silicone(*) ratio = (A)/(C) | 0 | 0 | 0 | 1 | 4 |
| Test Data |  |  |  |  |  |
| (1) Melt fluidity: MI | 28 | 27 | 28 | 35 | 40 |
| (2) IZOD impact strength | 65 | 65 | 8 | 60 | 55 |
| (3) UL-94 | V-0 | V-2 over | V-0 | V-0 | V-0 |
| (4) Recyclability |  |  |  |  |  |
| 1. IZOD impact strength | 65 | — | — | 60 | 55 |
| 2. Yellowing | 1.2 | — | — | 1.5 | 1.2 |

(*)Polyorganosiloxane.
(**)V-2 over: not corresponding to any of V-0, V-1 or V-2.

TABLE 4

|  | Comp. Ex. 8 | Comp. Ex. 9 | Comp. Ex. 10 | Comp. Ex. 11 | Comp. Ex. 12 |
|---|---|---|---|---|---|
| Composition |  |  |  |  |  |
| (A) |  |  |  |  |  |
| PC-2 | 75 | 50 | 75 | 75 | 75 |
| PC-PDMS-2 | 25 | 50 | 25 | 25 | 25 |
| (C) |  |  |  |  |  |
| Silicone-1 | — | — | — | — | — |
| Silicone-2 | — | — | — | — | — |
| Silicone-3 | — | — | — | 1 | — |
| (E) |  |  |  |  |  |
| Rubbery elastomer-1 | 2 | 2 | — | 2 | 2 |
| Rubbery elastomer-2 | — | — | — | — | — |
| Rubbery elastomer-3 | — | — | 2 | — | — |
| (D) |  |  |  |  |  |
| PTFE | 0.3 | 0.3 | 0.3 | 0.3 | 0.3 |

TABLE 4-continued

|  | Comp. Ex. 8 | Comp. Ex. 9 | Comp. Ex. 10 | Comp. Ex. 11 | Comp. Ex. 12 |
|---|---|---|---|---|---|
| (H) | | | | | |
| TBA oligomer | — | — | — | — | 5 |
| Silicone(*) content of resin (A) | 1 | 2 | 1 | 1 | 1 |
| Total silicone(*) content (wt. %) | 1 | 2 | 2 | 2 | 1 |
| Silicone(*) ratio = (A)/(C) | — | — | — | 1 | — |
| Test Data | | | | | |
| (1) Melt fluidity: MI | 33 | 43 | 32 | 37 | 32 |
| (2) IZOD impact strength | 60 | 55 | 65 | 65 | 55 |
| (3) UL-94 | V-2 over | V-2 over | V-2 over | V-2 over | V-0 |
| (4) Recyclability | | | | | |
| 1. IZOD impact strength | — | — | 55 | 60 | 45 |
| 2. Yellowing | — | — | 3.0 | 1.5 | 4.8 |

(*)Polyorganosiloxane.
(**)V-2 over: not corresponding to any of V-0, V-1 or V-2.

Regarding the flame-retardant polycarbonate resin composition in the second aspect of the invention, the following matters are obvious from the data in Table 3. The moldings of Example 6 are compared with those of Comparative Examples 6 and 7, and it is obvious that the former have good flame retardancy and impact resistance. As in the moldings of Comparative Example 10, the rubbery elastomer which is not a core/shell-type, grafted rubbery elastomer could not ensure the flame retardancy of the moldings When compared with the moldings of Comparative Example 12 that contain a halogen-containing flame retardant, the moldings of the invention are comparable to or better than them with respect to the flame retardancy, and are much better than them with respect to the recyclability. When PC-PDMS copolymer is used for the polycarbonate resin in the composition of the invention, the total silicon content of the composition can be reduced.

EXAMPLES 9 to 13, and COMPARATIVE EXAMPLES 13 to 16

The components shown in Table 5 and Table 6 were blended in the ratio indicated therein (the components (A) and (B) are in terms of % by weight, and the other components are in terms of parts by weight relative to 100 parts by weight of the resin mixture of (A) and (B)), fed into a vented double-screw extruder (TEM35 from Toshiba Kikai), melted and kneaded therein at 260° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 120° C. for 12 hours, and then molded into test pieces in a mode of injection molding at 260° C. The mold temperature was 80° C. These test pieces were tested for their properties in various test methods, and their data obtained are given in Table 5 and Table 6.

The materials used for producing the test samples, and the methods for testing the samples are mentioned below.

Details of Constituent Components
(A) Polycarbonate Resin:
  PC-1: as above.
(B) Styrenic Resin:
  HIPS: as above.
  ABS: as above.
(D) Fluoro-olefin Resin:
  PTFE: CD076 as above.
(F) Inorganic Filler:
  Talc: FFR (from Asada Milling), having a mean particle size of 0.7 μm.
  GF: 03MA419 (from Asahi Fiber Glass), having a diameter of 13 μm and a length of 3 mm.
(G) PC-polyorganosiloxane Copolymer:
  PC-PDMS-1:
  This is a bisphenol A-polydimethylsiloxane (PDMS) copolymer having an MI of 45 g/10 min (at 300° C., under a load of 1.2 kg), a PDMS chain length (n) of 30, a PDMS content of 4% by weight, and a viscosity-average molecular weight of 20,000 (prepared according to the method of Example 3-1 (A1) in Japanese Patent Laid-Open No 81620/1996), as above.
(C) Functional Group-having, or Functional Group-free Silicone Compound:
  Silicone-1: as above.
  Silicone-2: as above.
  Silicone-3: as above.

Test Methods
(1) Melt Fluidity:
  MI (melt index) of each sample is measured at 260° C. under a load of 2.16 kg, according to JIS K7210. The data are in terms of g/10 min.
(2) IZOD Impact Strength:
  As mentioned above. The same as above shall apply to the data in the tables.
(3) Flexural Modulus:
  Measured according to ASTMD-790 at 23° C. Samples tested have a thickness of 4 mm The data are in terms of MPa.
(4) Thermal Stability in Molding:
  An injection molding machine IS-45P is used. Thee molding temperature is 300° C. Each sample is, either directly or after having been kept stayed in the cylinder of the injection molding machine for 20 minutes, molded into test pieces having a thickness of 3 mm (80 mm×40 mm×3 mm). The color (L, a, b) of the test pieces directly molded and that of the test pieces molded after having been kept stayed in the cylinder for 20 minutes are measured with a calorimeter, and the color difference (ΔE) between them is obtained according to JIS H7103 (yellowing test).
(5) Flame retardancy:
  Tested according to the UL94 combustion test. Samples tested have a thickness of 1.5 mm or 2.5 mm.

TABLE 5

|  | Example 9 | Comp. Ex. 13 | Comp. Ex. 14 | Comp. Ex. 15 | Example 10 |
| --- | --- | --- | --- | --- | --- |
| Composition |  |  |  |  |  |
| (A) |  |  |  |  |  |
| PC-1 | 90 | 90 | 90 | 90 | 87 |
| (B) |  |  |  |  |  |
| HIPS | 10 | 10 | 10 | 10 | 13 |
| ABS | — | — | — | — | — |
| (D) |  |  |  |  |  |
| PTFE | 0.5 | 0.5 | 0.5 | 0.3 | 0.7 |
| (F) |  |  |  |  |  |
| Talc | 10 | — | 10 | 10 | 13 |
| GF | — | — | — | — | — |
| (G) |  |  |  |  |  |
| PC-PDMS-1 | — | — | — | — | 33 |
| (C) |  |  |  |  |  |
| Silicone-1 | 4 | 4 | — | — | 3 |
| Silicone-2 | — | — | — | — | — |
| Silicone-3 | — | — | — | 4 | — |
| Total silicone(*) content (wt. %) | 3.0 | 4.0 | 0 | 3.6 | 2.7 |
| Test Data |  |  |  |  |  |
| (1) Melt fluidity: MI | 6 | 8 | 10 | 9 | 6 |
| (2) IZOD impact strength | 40 | 65 | 20 | 25 | 50 |
| (3) Flexural modulus | 3400 | 2400 | 3500 | 3400 | 3400 |
| (4) Thermal stability in molding | 2 | 1 | 10 | 7 | 3 |
| (5) Flame retardancy |  |  |  |  |  |
| 1.5 mm thick | V-0 | V-2 over | V-2 over | V-2 over | V-0 |
| 2.5 mm thick | V-0, 5 VB | V-0 | V-2 over | V-2 over | V-0, 5 VB |

(*)Polyorganosiloxane.
(**)V-2 over: not corresponding to any of V-0, V-1 or V-2.

TABLE 6

|  | Example 11 | Example 12 | Comp. Ex. 16 | Example 13 |
| --- | --- | --- | --- | --- |
| Composition |  |  |  |  |
| (A) |  |  |  |  |
| PC-1 | 50 | 60 | 60 | 70 |
| (B) |  |  |  |  |
| HIPS | 50 | — | — | 30 |
| ABS | — | 40 | 40 | — |
| (D) |  |  |  |  |
| PTFE | 2.5 | 0.6 | 0.6 | 0.6 |
| (F) |  |  |  |  |
| Talc | 50 | — | — | 60 |
| GF | — | 40 | — | — |
| (G) |  |  |  |  |
| PC-PDMS-1 | 400 | 100 | 100 | 100 |
| (C) |  |  |  |  |
| Silicone-1 | — | 4 | 4 | — |
| Silicone-2 | — | — | — | 4 |
| Silicone-3 | — | — | — | — |
| Total silicone(*) content (wt. %) | 2.9 | 3.3 | 4.0 | 3.1 |
| Test Data |  |  |  |  |
| (1) Melt fluidity: MI | 4 | 11 | 12 | 10 |
| (2) IZOD impact strength | 55 | 8 | 75 | 15 |
| (3) Flexural modulus | 3400 | 5200 | 2300 | 4600 |
| (4) Thermal stability in molding | 4 | 1 | 3 | 5 |

TABLE 6-continued

| | Example 11 | Example 12 | Comp. Ex. 16 | Example 13 |
|---|---|---|---|---|
| (5) Flame retardancy | | | | |
| 1.5 mm thick | V-1 | V-0 | V-2 over | V-0 |
| 2.5 mm thick | V-0, 5 VB | V-0, 5 VB | V-0 | V-0, 5 VB |

(*)Polyorganosiloxane.
(**)V-2 over: not corresponding to any of V-0, V-1 or V-2.

The data in Table 5 and Table 6 verify the following:

<1> The stiffness and the flame retardancy of the moldings of Comparative Example 13 and Comparative Example 16, not containing the component (F), are both poor.

<2> The impact resistance, the thermal stability and the flame retardancy of the moldings of Comparative Example 14, not containing the component (C) and the component (G), are all poor.

<3> The stiffness, the thermal stability and the flame retardancy of the moldings of Comparative Example 15, containing an ordinary silicone compound for the component (C), are all poor.

INDUSTRIAL APPLICABILITY

Containing a reduced amount of non-halogen additives, the flame-retardant polycarbonate resin composition in the first aspect of the invention exhibits good flame retardancy, and, as a result, its impact resistance and thermal stability are both good. Owing to such good characteristics, the moldings of the composition have good wet heat resistance and are well recyclable. They can be used even in severe conditions and can be well recycled, therefore saving natural resources. They cause few environmental problems. Accordingly, their applications are expected to expand in various fields of, for example, OA appliances, information and communication appliances, other electric and electronic appliances for industrial use and household use, and car parts.

Containing a reduced amount of non-halogen additives, the flame-retardant polycarbonate resin composition in the second aspect of the invention exhibits good flame retardancy, and, as a result, its impact resistance and thermal stability are both good. Owing to such good characteristics, the moldings of the composition are well recyclable. They can be well recycled, therefore saving natural resources They cause few environmental problems. Accordingly, their applications are expected to expand in various fields of, for example, OA appliances, information and communication appliances, other electric and electronic appliances for industrial use and household use, and car parts.

Containing a reduced amount of non-halogen and non-phosphorus additives, the flame-retardant polycarbonate resin composition in the third aspect of the invention exhibits good flame retardancy, and, as a result, its moldability, impact resistance and thermal stability are all good. Accordingly, its applications are expected to expand in various fields of, for example, OA appliances, information and communication appliances, other electric and electronic appliances for industrial use and household use, and car parts.

What is claimed is:

1. A flame-retardant polycarbonate resin composition comprising 100 parts by weight of a resin mixture of (A) from 1 to 99% by weight of a polycarbonate resin and (B) from 1 to 99% by weight of a styrenic resin, from 0.01 to 5 parts by weight of (D) a fluoro-olefin resin, from 1 to 100 parts by weight of (F) an inorganic filler, from 1 to 500 parts by weight of (G) a polycarbonate-polyorganosiloxane copolymer and from 0.1 to 10 parts by weight of (C) a functional group-having silicone resin, wherein the functional group-having silicone compound (C) is an organopolysiloxane having a basic structure of a general formula (1)

$R^1_a R^2_b SiO_{(4-a-b)/2}$ wherein $R^1$ indicates a functional group, $R^2$ indicates a hydrocarbon residue having from 1 to 12 carbon atoms, and a and b are numbers satisfying the relations of $0 < a \leq 3$, $0 \leq b < 3$, and $0 < a + b \leq 3$.

2. A molding of the flame-retardant polycarbonate resin composition of claim 1.

3. An injection molding of the flame-retardant polycarbonate resin composition of claim 1.

4. A housing, or part adapted for an electric or electronic appliance obtained by injection molding the flame-retardant polycarbonate resin composition of claim 1.

5. A flame-retardant polycarbonate resin composition comprising 100 parts by weight of a resin mixture of (A) from 1 to 99% by weight of a polycarbonate resin and (B) from 1 to 99% by weight of a styrenic resin, from 0.01 to 5 parts by weight of (D) a fluoro-olefin resin, from 1 to 100 parts by weight of (F) an inorganic filler, from 1 to 500 parts by weight of (G) a polycarbonate-polyorganosiloxane copolymer and from 0.1 to 10 parts by weight of (C) a functional group-having silicone resin, wherein the functional group in the functional group-having silicone compound (C) is selected from an alkoxy group, a vinyl group, a hydride residue, and an epoxy group.

6. A molding of the flame-retardant polycarbonate resin composition of claim 5.

7. An injection molding of the flame-retardant polycarbonate resin composition of claim 5.

8. A housing or part adapted for an electric or electronic appliance obtained by injection molding the flame-retardant polycarbonate resin composition of claim 5.

9. A flame-retardant polycarbonate resin composition comprising 100 parts by weight of a resin mixture of (A) from 1 to 99% by weight of a polycarbonate resin and (B) from 1 to 99% by weight of a styrenic resin, from 0.01 to 5 parts by weight of (D) a fluoro-olefin resin, from 1 to 100 parts by weight of (F) an inorganic filler, from 1 to 500 parts by weight of (G) a polycarbonate-polyorganosiloxane copolymer and from 0.01 to 10 parts by weight of (C) a functional group-having silicone resin, wherein the functional group in the functional group-having silicone compound (C) is a methoxy group or a vinyl group.

10. A molding of the flame-retardant polycarbonate resin composition of claim 9.

11. An injection molding of the flame-retardant polycarbonate resin composition of claim 9.

12. A housing or part adapted for an electric or electronic appliance obtained by injection molding the flame-retardant polycarbonate resin composition of claim 9.

* * * * *